United States Patent [19]

Balter

[11] Patent Number: 4,779,649
[45] Date of Patent: Oct. 25, 1988

[54] GATE VALVE WITH CAMMING WEDGE, PRESSURE EQUALIZER, AND REPLACEABLE BLEEDER VALVE

[75] Inventor: Valentin Balter, Cupertino, Calif.

[73] Assignee: Huntington Mechanical Laboratories, Inc., Mountain View, Calif.

[21] Appl. No.: 8,661

[22] Filed: Jan. 30, 1987

[51] Int. Cl.[4] ............................................... A16K 3/02
[52] U.S. Cl. .................. 137/630.12; 251/197
[58] Field of Search ................... 137/630.12; 251/197, 251/204

[56] References Cited

U.S. PATENT DOCUMENTS 3,125,323 3/1964 Heinen ................................. 251/197
3,695,578 10/1972 Walther ........................ 251/197 X
4,408,634 10/1983 Peacock ......................... 137/630.12

Primary Examiner—Robert G. Nilson
Attorney, Agent, or Firm—David Pressman

[57] ABSTRACT

A gate valve for controlling the passage of fluid between inlet and outlet openings comprises a housing (40) containing a reciprocating expandable gate element formed of a wedge (54) which is sandwiched between two spring-loaded plates (56 and 58) so that reciprocation of the wedge causes expansion of the plates for closing the valve's openings. In order to facilitate the return stroke of the wedge and to overcome the holding force of the vacuum on one of the plate, the device includes a bleeder valve element (80) which is connected to the first plate and has a seat on the second plate so that when the first plate (56) located on the higher pressure side commences its movement, it opens the bleeder valve element and equilizes the pressures on both sides of the valve. This eliminates the vacuum and thus the holding force. In the second embodiment, the valve has a time-delay mechanism which delays retraction of the plate on the low pressure side until a certain equilibrium of pressure is achieved.

4 Claims, 2 Drawing Sheets

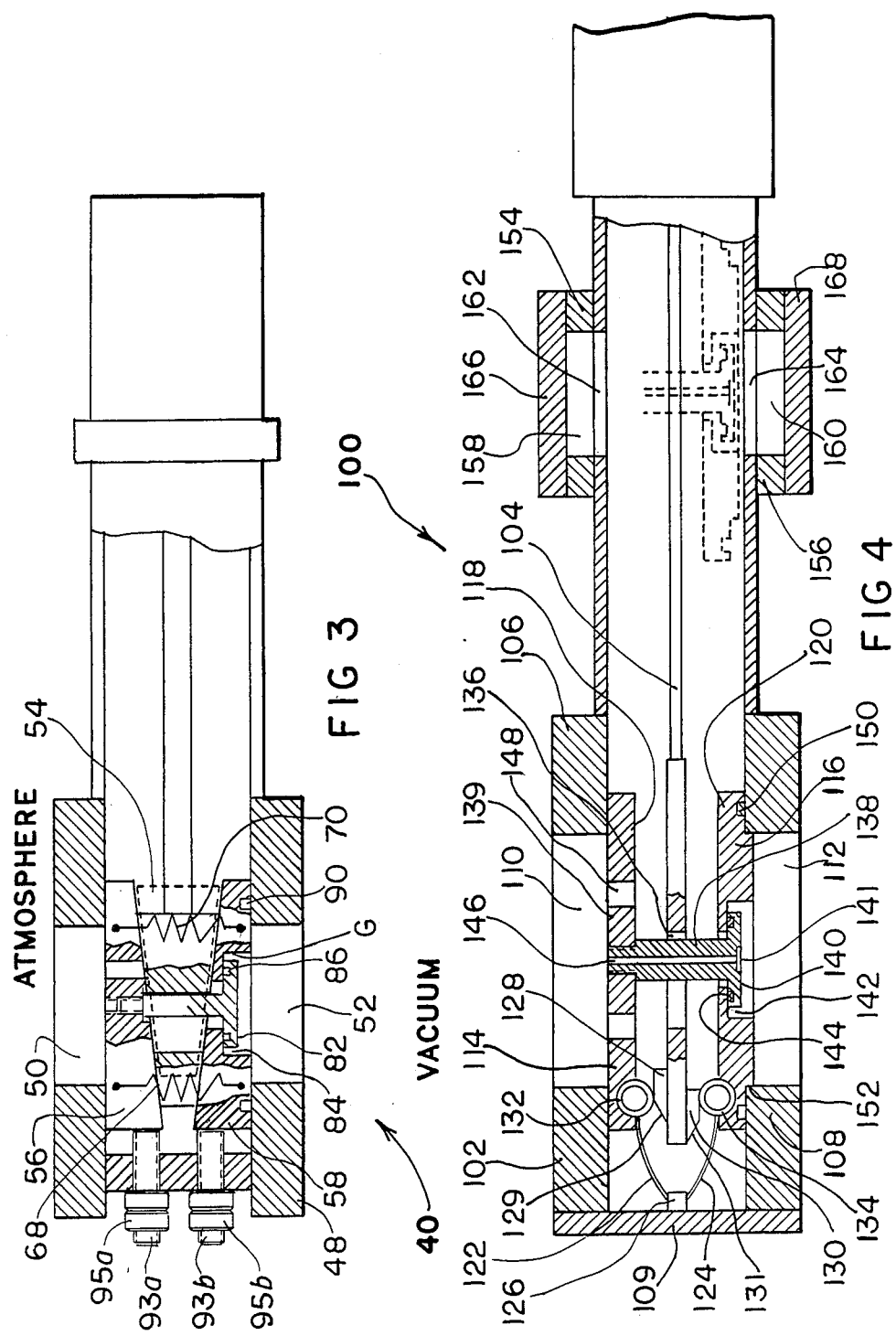

GATE VALVE WITH CAMMING WEDGE, PRESSURE EQUALIZER, AND REPLACEABLE BLEEDER VALVE

BACKGROUND

1. Field of Invention

This invention relates to gate valves, particularly to a gate valve of the type employing a camming wedge which shifts valve elements into positions which seal the valve's openings.

2. Description of Prior Art

Gate valves are widely used to control fluid flow through pipes in industrial, domestic, and commerical installations, pipelines, or the like.

One such valve is described in U.S. Pat. No. 2,502,689 to C. W. Yant, April 1950. This prior-art valve is shown schematically in FIG. 1 of the present drawings. It consists of a valve housing 10 which contains a first plate 12, a second plate 14, and a movable wedge 16 between the plates. Plates 12 and 14 have tapering surfaces 18 and 20 which are in constant contact with the respective sides of wedge 16 under the effect of compression springs 22 and 24. Housing 10 is rectangular in shape and has a first side 26 and a second side 28 with through openings 30 and 32, respectively. Sides 26 and 28 have flanges (not shown) mounted thereon so that the valve can be installed in a pipe (not shown).

The wide end of wedge 16 is connected to a drive rod 35 of a drive unit 34 which may comprise, e.g., a pneumatic cylinder (not shown). An O-ring 29 is mounted in the outer surface of plate 14. When the valve is closed, this ring aids in sealing plate 14 against side 28 over opening 32.

In operation, drive unit 34 moves wedge 16 and plates 12 and 14 toward end stop 36. Until the ends of plates 12 and 14 contact the surface of end stop 36, the plates move with wedge 36. When the ends of plates 12 and 14 contact the inner side of stop 36, the plates must stop, but drive rod 35 will continue to push wedge 16 further to the left, to the position shown in FIG. 1. This action will cam plates 12 and 14 radially outwardly until O-ring 29 and plate 14 seal opening 32. Plate 12 will also come in contact with side 26, but as there is no O-ring to seal the space between plate 12 and side 26, atmospheric pressure will always be present inside the housing.

The prior-art valve, although simple in construction and inexpensive to manufacture, had a serious operational problem: When one desired to open the valve in the presence of a considerable pressure differential across the valve, he or she would cause drive rod 35 to move to the right so as to open the valve. Wedge 16 is pulled to the right forming a gap with plates 12 and 14. The force of springs 22 and 24 will shift plate 12 down. Atmospheric pressure inside the housing, however, will keep second plate 14 in place. Thus drive unit 34 must overcome the friction created by this force. As a result, drive unit 34 must be made more powerful than if such friction were not present.

In addition, when the drive unit pulls wedge 16 further to the right, friction will be present between plate 14 and side 28, causing plate 14 and its O-ring 29 to drag against side 28. This will wear O-ring 29 more rapidly than if such pressure were absent. As a result, the O-ring requires frequent replacement. Such replacement involves labor and material costs, plus additional expenses associated with shutting off the system or the pipeline.

Thus the industry would benefit by an improved gate valve free of the above-described disadvantages.

OBJECTS AND ADVANTAGES OF THE INVENTION

Accordingly, several objects of the present invention are to provide a gate valve which is simple in construction, reliable in operation, easy to close or open, and resistant to wear and deterioration. Another object is to provide a gate valve which can be easily disassembled. Other objects and advantages of the invention will be understood after consideration of the ensuing description and claims.

DRAWINGS

FIG. 3 is a similar view of the gate valve in a closed position.

FIG. 4 is a schematic sectional view of the gate valve made according to another embodiment of the invention.

REFERENCE NUMERALS USED IN THE DESCRIPTION AND DRAWINGS

Figure 1:
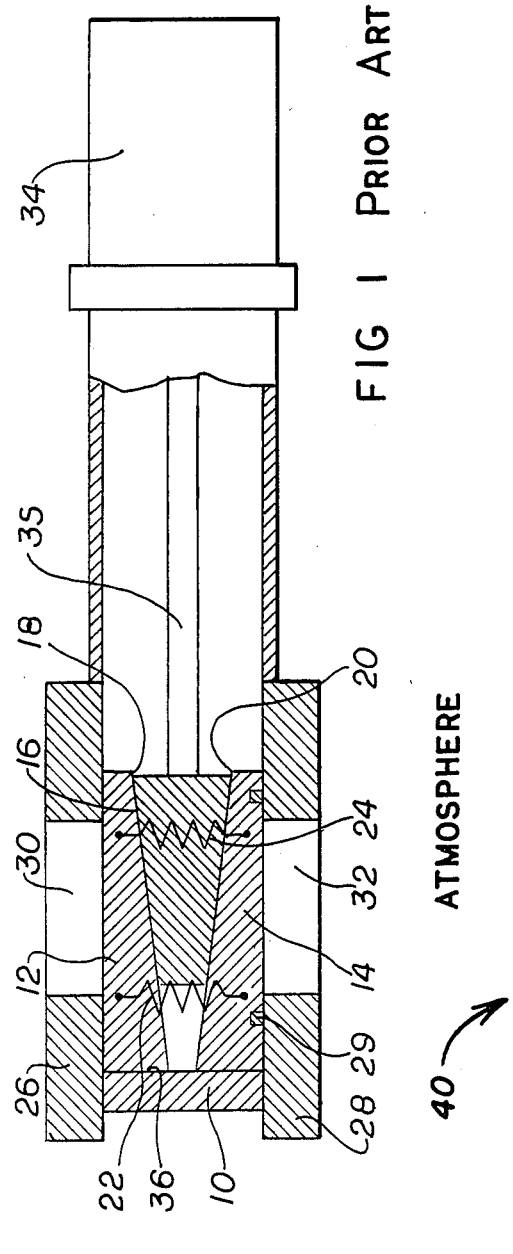
FIG. 1 is a cross-sectional view of a prior-art gate valve.

10—housing
12—first plate
14—second plate
16—wedge
18, 20—tapering surfaces
22, 24—compression springs
26—first wall
28—second wall
29—O-ring
30, 32—through openings
34—reciprocating drive
35—drive rod
36—end stop
40—gate valve
42, 44—side walls
46—upper wall
48—lower wall
50, 52—through openings
54—wedge
56—upper plate
58—lower plate
60, 62—outer surfaces
64, 66—inner surfaces
68, 70—compression springs
72—piston rod
74—piston
76—packing ring
78—hole
80—stem
82—bleeder valve element
84—recess
86—first O-ring
88—through opening
90—second O-ring
93a, 93b—studs
94a, 94b—ends of plates 56 and 58
95a, 95b—lock nuts
100—gate valve
102—housing 104—plunger
106—upper wall
108—lower wall
109—front wall
110, 112—openings
114—upper plate
116—lower plate
118, 120—inner surfaces of the plates
122, 124—compression leaf springs
126—stop block
128—upper cam
129—camming surface
130—lower cam
132—upper roller
134—lower roller
136—hole in the plunger
138—bleeder valve stem
139—thread
140—bleeder valve head
141—recess
142—recess
144—second O-ring
146—orifice
148—through opening in the upper plate
150—first O-ring
152—boss
154, 156—side walls
158, 160—holes
162, 164—openings in the housing
166, 168—covers

FIGS. 2 AND 3—DESCRIPTION OF GATE VALVE WITH TAPERING PLATES

Figure 2:
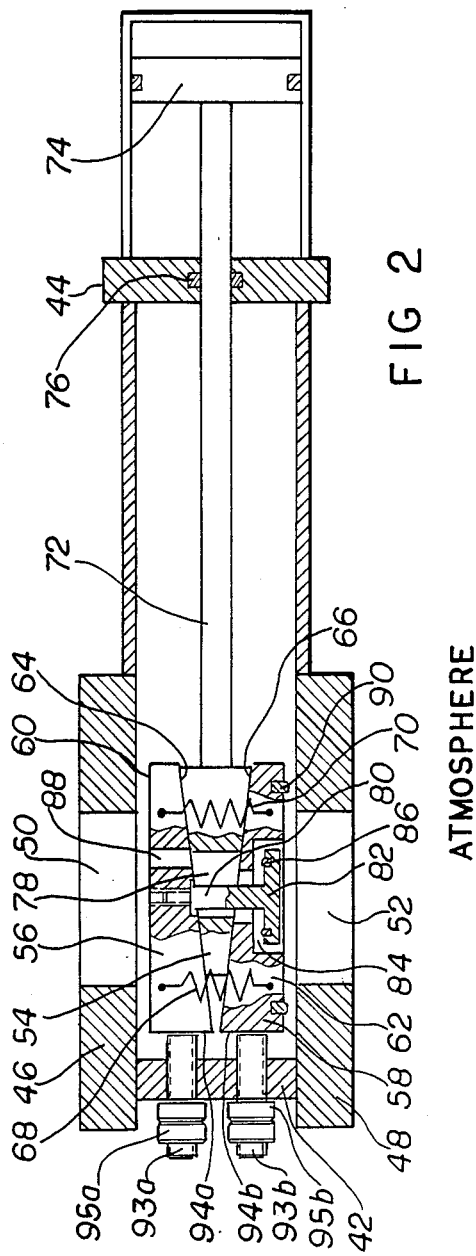
FIG. 2 is a schematic sectional view of the gate valve of the present invention in an open position.

A gate valve 40 in accordance with one preferred embodiment of the invention is shown in FIG. 2 (open position) and FIG. 3 (closed position);

Similar to the prior-art gate valve, the valve of the invention has a housing formed by six rectangular walls, only four of which are shown. The four walls shown are upper and lower walls 46 and 48, and left and right end walls 42 and 44. The housing formed by these walls has a box-like rectangular configuration. The front and rear rectangular walls, which are parallel to the paper, are not shown; these front and rear walls sandwich the four walls shown. End walls 42 and 44 have a square configuration. The terms "upper", "lower", "left", and "right" are arbitrary and are used only for convenience; in an actual device the walls may have any other relative positions.

Walls 46 and 48 have through openings or ports 50 and 52, respectively. When the valve is installed in a pipe, the ends of the pipe are connected to these openings by conventional flanges which are bolted or welded onto walls 46 and 48, respectively.

A wedge 54 is located inside the housing. In the illustrated example, wedge 54 points toward wall 42. The wedge is sandwiched between two plates, i.e., an upper plate 56 and a lower plate 58. The definition of the plates as 37 upper" and "lower" also is arbitrary; skilled artisans will understand that these plates can assume any other relative positions. The plates have flat outer surfaces 60 and 62 and tapered inner surfaces 64 and 66, respectively. Inner surfaces 64 and 66 of the plates are constantly tightly pressed to the outer surfaces of wedge 54 by means of compression springs 68 and 70. Skilled artisans understand that the springs are shown schematically and that any other resilient tightening device can be used for this purpose, e.g., leaf springs.

The broad side of wedge 54 (opposite to left end wall 42) is connected to a piston rod 72 which in turn is connected, at its other end, to a piston 74 of a pneumatic cylinder. Skilled artisans will understand that the pneumatic cylinder is shown for exemplary purposes only; any other reciprocating drive unit, suitable for the particular application, can be used.

Rod 72 protrudes into the interior of the valve housing through a wall 44. An appropriate packing ring 76 seals the piston rod in wall 44. A bellows can be used as sealing means instead of packing ring 76.

A hole 78 is formed in wedge 54 for passage of a stem 80. The upper end of stem 80 is rigidly fixed to upper plate 56, e.g., by thread, while its lower end is attached to a bleeder valve element 82. Hole 78 is large enough to allow movement of wedge 54 with respect to plates 56 and 58.

Valve element 82 is seated in a recess 84 formed in lower plate 58; its upper surface contains a first O-ring 86 which seals against the above-mentioned seat for sealing the space above the element 82.

Upper plate 56 has a through opening 88 which interconnects the space above upper wall 46 with space 78 above bleeder valve element 82.

Recess 84 in lower plate 58 is deeper than the height of bleeder valve element 82 so that the lower surface of the element is flush with lower surface 62 of lower plate 58. A second O-ring 90 is located on such lower surface 62. The second O-ring provides sealing engagement with the inner surface of lower wall 48.

Wall 42 has two threaded studs 93a and 93b which are locked in adjusted positions by nuts 95a and 95b with respective sealing means, not shown. The right-hand ends of these studs form stops which contact ends 94a and 94b of the upper and lower plates.

OPERATION

The gate valve of FIGS. 2 and 3 operates in the following manner.

Assume (FIG. 2) that initially the valve is open with piston 74 in its righthand position. No fluid pressure difference is applied across ports 50 and 52.

Next assume that the drive unit is actuated so that piston 74 and piston rod 72 move to the left from the position shown in FIG. 2. Wedge 54, driven by rod 72, moves left with upper and lower plates 56 and 58. Movement continues until ends 94a and 94b of upper and lower plates 56 and 58, respectively, contact studs 93a and 93b. When the plates stop, wedge 54 will continue leftward movement whereupon it will cam plates 56 and 58 radially outwardly.

This expansion of the plates, which overcomes the resistance of compression springs 68 and 70, continues until upper plate 56 is pressed against the inner surface of upper wall 46 and lower plate 90 is pressed against the inner surface of lower wall 48. Thereupon O-ring 90 will seal lower opening 52. Also first O-ring 86 makes sealing contact with its seat in lower plate 58 because of the radial outward movement of upper plate 56 together with stem 80.

At this moment the drive unit is stopped and the valve components are in the position shown in FIG. 3. In other words, the valve is now in its shut-off position, in which it blocks the flow of the fluid between the upper and lower walls.

Assume now that fluid pressure is applied. For exemplary purposes assume that gas at atmospheric pressure is present at port 50 and a vacuum is present at port 52.

The valve will maintain this pressure differential because of the valve's closed state.

Next assume that an operator or an automatic control (not shown) commands or causes the driven unit to open the valve. Piston 74 starts moving to the right, shifting wedge 54 to the position shown by the broken lines in FIG. 3. The force of compression springs 68 and 70 will move upper plate 56 downwardly, as shown in FIG. 2. As a result, a gap is formed between the inner surface of upper wall 46 and upper plate 56 so that the upper plate can be withdrawn to the open position of the valve without resistance.

Without bleeding valve element 82, the lower side of lower plate 58 would have experience friction resistance against side 48 due to the vacuum. In the valve of the invention, however, bleeder valve element 82, which is connected to upper plate 56, eliminates this problem. In other words, when the return stroke of the piston 74 commences, upper plate 56 moves down, and bleeder valve element 82 also shifts downwardly. Movement of element 82 forms a gap G (FIG. 3) between the bottom of the recess and the upper surface of the bleeder valve element, which for this case is shown by a broken line in FIG. 3. Through this gap the pressures on both sides of the valve are equalized.

If the pressure differential is reversed so that atmospheric pressure is at port 52 and a vacuum is present at port 50, there will be no problem at all, since this pressure differential will assist the compression spring in unsealing the valve. Thus when wedge 54 is retracted, the atmospheric pressure at port 52 will shift lower plate 58 inwardly together with O-ring 90. A gap will be immediately formed between the lower wall and the lower plate. Because there is no seal between the upper wall and the upper plate, atmospheric pressure will immediately penetrate to the other side of the valve and the pressures will be set at equilibrium.

FIG. 4—GATE VALVE WITH TIMING CAMS ON PLUNGER

FIG. 4 is a longitudinal sectional view of another embodiment of the gate valve of the invention.

The gate valve of FIG. 4, which is designated in general by reference numeral 100, has a housing 102, which is similar to one described in connection with the embodiment of FIGS. 2 and 3. The housing contains a moveable plunger 104 connected to a reciprocating drive unit (not shown), which may be a pneumatic or a hydraulic power cylinder. The upper and lower sides of a box-like housing 102 are formed by an upper wall 106 and a lower wall 108. The front end of the housing is defined by a plate 109 and the rear end by another plate (not shown). Walls 106 and 108 have openings 110 and 112 and are intended for the installation of the valve within a pipeline (not shown) so that the valve can control fluid flow therein.

The front end of plunger 104 is sandwiched between two plates, i.e., an upper plate 114 and a lower plate 116. In distinction from the embodiment of FIGS. 2 and 3, plates 114 and 116 are flat on both sides. Upper plate 114 is connected to a compression leaf spring 122, while lower plate 116 is connected to compression leaf spring 124. The front ends of the springs 122 and 124 are connected to an anchor and stop block 126. Springs 122 and 124 are tensioned to pull plates 114 and 116 toward each other.

Plunger 104 carries an upper cam 128 on its upper side facing upper plate 114 and a lower cam 130 on its lower side, facing lower plate 116. Cam 128 has an inclined camming surface 129 and cam 130 has an inclined camming surface 131. These cams are designed to engage respective cam followers in the form of rollers, namely upper roller 132, attached to upper plate 114, and lower roller 134, attached to lower plate 116.

Camming surface 131 of cam 130 is positioned forward in the axial direction of plunger 104 (i.e., in the direction opposite to the drive unit) with respect to camming surface 129 of cam 128. Thus when plunger 104 is retracted in the rearward direction, camming surface 129 of cam 128 comes into contact with upper roller 132 earlier than respective camming surface 131 of element 130 comes into contact with lower roller 134.

Plunger 104 contains a hole 136 through which a stem 138 extends. The upper end of stem 138 is rigidly fixed to upper plate 114, i.e., by thread 139, while its other end carries a bleeder valve element 140. On the side opposite to stem 138, bleeder element 140 has a recess 141 (preferably square, but optionally hexagonal) for receiving a square or Allen wrench for unscrewing the stem (with bleeder valve element 140 attached) from upper plate 114. The valve has two O-rings, i.e., a first O-ring 150 which is located on the outer surface of lower plate 116 and serves to seal plate 116 to the inner surface of lower wall 108, and a second O-ring 144 on the upper surface of bleeder valve element 140. The latter is seated in a recess 142 formed in lower plate 116 and has the above-mentioned second O-ring 144 on its upper surface. The purpose of second O-ring 144 is to seal the space above the bleeder valve element.

Bleeder valve 138-140 has an orifice 146 which permits small constant fluid flow from the upper pressure side to the lower pressure side. Orifice 146 may be within the range of 0.1 to 5 mm in diameter for use in a valve for controlling fluid flow.

Upper plate 114 has a through opening 148 which communicates the space above the upper flange with the space above bleeder valve element 140.

Recess 142 in the lower plate is deeper than the height of bleeder valve element 140 so that the lower surface of element 140 is flush with the outer surface of lower plate 116.

In addition, the outer surface of lower plate 116 has a boss or projection 152 which is inserted into a respective recess of lower wall 108. Engagement between boss 152 and the abovementioned recess prevents lower plate 116 from moving axially with the plunger and upper plate 114, unless lower plate 116 is raised to a height sufficient to pass over the lower wall without contact with the latter. Such an arrangement protects O-ring 150 from damage and wear.

At the rear end, i.e., closer to the drive unit (not shown), housing 102 has a pair of aligned bosses 154 and 156, which are located diametrically opposite one another and have holes 158 and 160. These holes are aligned with respective openings 162 and 164 formed on opposite sides of housing 102. Bosses 154 and 156 are closed by respective covers 166 and 168. In the extreme retracted position of plunger 104, bleeder valve 138-140 assumes a position in the center of openings 162 and 164 so that it can be easily removed and replaced after disconnection of covers 166 and 168.

OPERATION OF FIG. 4 EMBODIMENT

Assume that initially the valve is open with plunger 104 in its righthand position (not shown) at which no fluid pressure difference is applied across ports 110 and 112. Plates 114 and 116 are moved closer to each other under the effect of compression springs 122 and 124, and rollers 132 and 134 are in front of respective camming surfaces 129 and 131 of cams 128 and 130.

When drive unit is actuated, its plunger 104 moves to the left. Until stop block 126 contacts front end 109 of housing 102, the assembly consisting of plunger 104, upper plate 114, lower plate 116, springs 122 and 124, and stopper 126 moves to the left as an integral unit. When block 126 contacts front end 109 of the housing, the plates stop, but plunger 104 continues its forward stroke so that its cams 128 and 130 will force cam followers 132 and 134 and their respective plates 114 and 116 radially outwardly (against the force of compression leaf springs 122 and 124). As a result, the outer surfaces of plates 114 and 116 engage the inner surfaces of walls 102 and 108.

At the same time, second O-ring 144 comes in sealing contact with its seat. In this position, boss 152 snaps in the recess of wall 108 and first O-ring 150 seals opening 112 so that communication between both openings 110 and 112, i.e., through the pipeline controlled by gate valve 100, continues only through orifice 146 in the bleeder valve. At this moment the drive unit stops and holds the parts of the gate valve in the positions shown in FIG. 4. In other words, in FIG. 4 the valve's parts shown by solid lines are in closed position.

Assume now that the atmospheric pressure is established above upper wall 106 and a vacuum is established below lower wall 108. The valve, being closed, will maintain this pressure differential.

Next assume that a command is given to the drive unit to retract plunger 104 to the right to open the valve. Plunger 104 starts moving to the right, and roller 132 contacts the camming surface 129 of cam 128 earlier than roller 134, which still remains on a horizontal portion of cam element 130. As a result, upper plate 114 starts moving radially inwardly under the effect of leaf spring 122 earlier than lower plate 116. This provides a certain time delay sufficient for equalizing pressures on both sides of the valve prior to upward movement of plate 116 and hence prior to separation of seal 150 from the upper surface of lower wall 108.

When upper plate 114 moves downwardly, it also shifts bleeder valve elements 138 and 140 downwardly. As a result, a gap (not shown) is formed between the bottom of recess and the upper surface of the bleeder valve element. This gap enables the pressures on both sides of the valve to equalize.

After the pressures equalize, lower roller 130 will reach the camming surface 131 of cam 130 and lower plate 116 will start its inward movement, releasing shoulder 152 from the respective recess of the lower flange. As a result, prior to to its return stroke, lower plate 116 will be raised to a height sufficient to prevent first O-ring 150 from contact with the lower flange 108. This protects the O-ring from deterioration and wear.

If the user desires to replace the bleeder valve with one having a different diameter to orifice 146, e.g., to change the fluid flow through the valve, plunger 104 is brought to its extreme right, i.e., the retracted position shown by broken lines in FIG. 4. In this position, bleeder valve 138-140 is aligned with opening 162. Cover 168 is then removed, permitting access to bleeder valve, which can be unscrewed from upper plate 114 by inserting a wrench into recess 141.

SYNOPSIS, RAMIFICATIONS, AND SCOPE

Thus the reader will see that the valve of the invention provides a gate valve which is simple in construction, reliable and smooth in operation, easy to close or open, and resistant to wear and deterioration. The valve can be easily disassembled.

While the present invention has been illustrated in the form of a specific embodiments shown in FIGS. 2, 3 and 4, those skilled in the art will understand that these embodiments have been given only as examples and that many other modifications are possible within the scope of the appended claims. For example, the terms "upper" and "lower" plates are arbitrary and are used only with respect to the position of the valve and its drive unit on the drawing. Of course the valve may assume a vertical or inclined position as well. The drive unit may be arranged on the left side of the device so that in this case it will pull the wedging element or the plunger (rather than push). The examples with a vacuum and the atmospheric pressure are also arbitrary; the pressures on both sides can be above atmospheric, but at different levels. The valve can be used for any fluid, gaseous or liquid. Other drive means, such as nut and a lead screw driven from an electric motor can be employed, as well as a manual drive. In the embodiment of FIG. 4, four flat springs and two pairs of cams and rollers can be used and only one opening 164 is sufficient for removal of the bleeder valve 138-140. Therefore the scope of the invention should be determined, not by the examples given, but by appended claims and their legal equivalents.

I claim:

1. A gate valve means, comprising:
   a housing having an inlet opening, an outlet opening, and a valve chamber within said housing;
   a reciprocating plunger means moveable in the direction perpendicular to an axis interconnecting said openings inside said valve chamber;
   reciprocating drive means connected to said reciprocating plunger means for causing reciprocation thereof;
   first and second plate-like elements sandwiching said plunger means;
   compression leaf spring means constantly urging said plate-like elements towards each other so that said plunger means is constantly squeezed between said plate-like elements;
   said plate like elements being moveable in the direction of said axes against the force of said resilient means to positions which close said openings;
   first and second camming means on said plunger means, first cam follower means on said first plate-like element and second cam follower means on said second plate-like element, said first camming means engaging said first follower means and said second camming means engaging said second follower means, said first and second camming means being shifted in axial direction of said plunger means with respect to each other so that during retraction of said plunger means, said first follower is released from said first camming means earlier than said second follower is released from said second camming means;
   bleeder valve means having a valve element connected to said first plate-like element and having a valve seat on said second plate-like element;

first sealing means between said valve seat and said bleeder valve element;

second sealing means located between one of said plate elements and said housing and capable of cutting off communication between said openings;

means in said housing for removal of said bleeder valve means from said gate valve means without dismantling of said gate valve means; and means for positively restraining said second plate-like element against movement in the axial direction of said plunger means until said second plate-like element is raised to a height which prevents sliding of said second sealing means over the surface of said housing.

2. A gate valve means according to claim 1 wherein said plunger means further having a through opening for passage and transverse displacement of said valve element, said second plate-like element having a recess which functions as said seat, said first sealing means comprising an O-ring inserted into said valve element and cooperating with said seat.

3. A gate valve means according to claim 1 wherein said means for removal of said bleeder valve means comprise an opening in said housing which is aligned with the position of said bleeder valve means in an extreme retracted position of said plunger means, said housing further having a cover which normally covers said opening; said bleeder valve means being removably connected to said first plate-like element.

4. A gate valve means according to claim 1 wherein said means which positively restrain said second plate-like element comprises a recess in said housing and a boss on said second plate-like element, said shoulder being engageable with said recess so that when said shoulder engages said recess, said second plate-like element can be raised but cannot be removed in the axial direction of said plunger means.

* * * * *

UNITED STATES PATENT AND TRADEMARK OFFICE
CERTIFICATE OF CORRECTION

PATENT NO. : 4,779,649

DATED : 1988 Oct 25

INVENTOR(S) : Balter, Valentin

It is certified that error appears in the above-identified patent and that said Letters Patent are hereby corrected as shown below:

Title page:

Abstract, line 9, change "plate" to --plates--.

Col. 1, line 56, after "right" insert --,--.

Claim 2, line 2, change "having" to --has--.

Claim 3, line    change "comprise" to --comprises--.

Signed and Sealed this

Twenty-first Day of March, 1989

*Attest:*

DONALD J. QUIGG

*Attesting Officer*   *Commissioner of Patents and Trademarks*